United States Patent [19]
Hsueh

[11] Patent Number: 5,434,374
[45] Date of Patent: Jul. 18, 1995

[54] DETACHABLE FILTER AND MUFFLER DEVICE

[76] Inventor: Tien-Chu Hsueh, 467, Yuan-Shan Rd., Chung-Ho City, Taiwan

[21] Appl. No.: 159,529

[22] Filed: Dec. 1, 1993

[51] Int. Cl.6 .......................... F01N 7/08; F01N 7/18; F01N 1/24
[52] U.S. Cl. .................... 181/228; 181/227; 181/243; 181/258
[58] Field of Search ............... 181/227, 228, 231, 232, 181/243, 258

[56] References Cited

U.S. PATENT DOCUMENTS

| | | | |
|---|---|---|---|
| 4,278,147 | 7/1981 | Watanabe et al. | 181/256 |
| 4,474,260 | 10/1984 | Valentine | 181/230 |
| 4,858,722 | 8/1989 | Abbe et al. | 181/243 |
| 4,884,657 | 12/1989 | Osada | 181/258 |
| 5,036,947 | 8/1991 | Metzger | 181/241 |
| 5,162,622 | 11/1992 | Malmsten | 181/227 |
| 5,177,962 | 1/1993 | Hall et al. | 181/231 |

*Primary Examiner*—M. L. Gellner
*Assistant Examiner*—Nicholas J. Tuccillo
*Attorney, Agent, or Firm*—Marks & Murase; Michael D. Bednarek

[57] ABSTRACT

This invention relates to a detachable filter and muffler device used in an exhaust system, wherein the filter and muffler device is easily detachable so that the maintenance of the exhaust system is simplified, and the cost of maintenance is reduced.

9 Claims, 8 Drawing Sheets 5,434,374

DETACHABLE FILTER AND MUFFLER DEVICE

BACKGROUND OF THE INVENTION

1. Technical Field of the Invention

The present invention relates to a filter and muffler device used in an exhaust system, especially to a detachable filter and muffler device used in an exhaust system.

2. Description of Related Art

Conventional filter and muffler devices used in exhaust pipes of vehicles are fixed within the exhaust pipes. In such structures, back pressure will rise when particles or other dirt accumulate, and cause a reduction of engine power, or even damage the engine system. Furthermore, the filter and muffler device can only be replaced together with the entire exhaust pipe after a long duration of use. Since exhaust pipes last longer than before, such replacements are wasteful.

SUMMARY OF THE INVENTION

It is therefore an object of this invention to provide a detachable filter and muffler device used in an exhaust system.

Another object of the present invention is to provide a low-cost exhaust pipe for use in an exhaust system.

This object of the present invention are fulfilled by providing a detachable filter and muffler system used in the exhaust pipe of an engine system for absorbing the noises and filtering out the contaminants in the exhaust pipe, including a shell, a filter and muffler device, which is characterized in that said filter and muffler device is screwed in said shell.

The further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION OF THE EMBODIMENTS

The detachable filter and muffler system according to the present invention includes a shell and a filter and muffler device. The entire system is disposed at the middle of an exhaust pipe of an vehicle. The filter and muffler device is screwed within the shell, and is easily dismounted.

Figure 1:
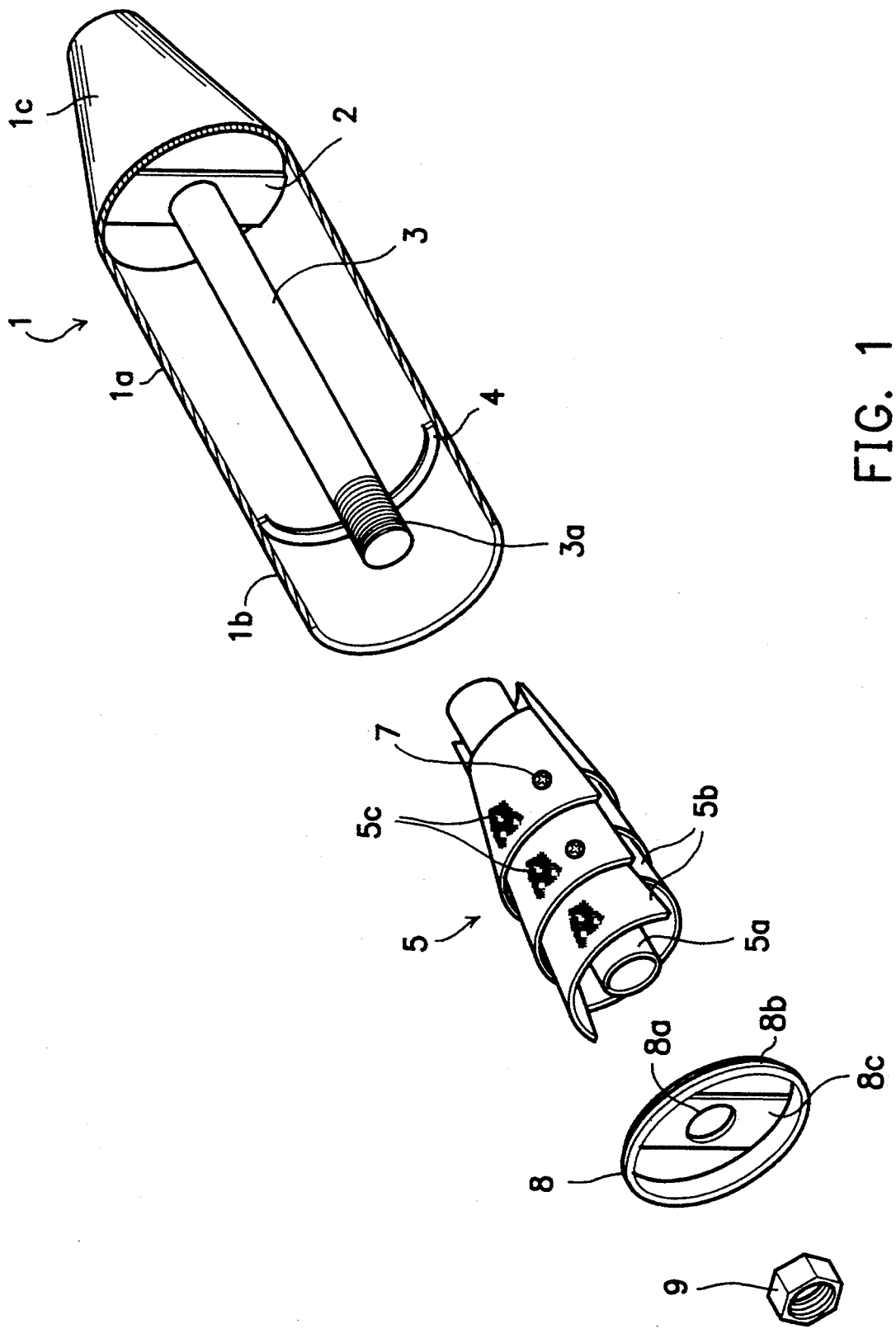
FIG. 1 is a partly sectional exploded perspective view of an embodiment according to the present invention.

FIG. 1 shows the first embodiment of the present invention used in a motorcycle. Shell 1 is composed of a first external pipe 1a, a second external pipe 1b, a cone 1c, a stopper 8, and a screw 9. A supporting plate 2 is welded to one end of the first external pipe 1a before the second external pipe 1b and the cone 1c are assembled. A central axle 3 is welded to the center of the supporting plate 2, and extends within the first external pipe 1a along its longitudinal axis. A screw thread 3a is provided at one end of the central axle 3 opposite to the supporting plate 2 to receive the screw 9. The central axle 3 slightly extends out of the first external pipe 1a into the second external pipe 1b. A ring 4 is provided at the inner edge of the end of the first external pipe 1a opposite to the supporting plate 2. The stopper 8 consists of a taper ring 8b and a supporting plate 8c. The supporting plate 8c has a hole at its center. After the internal structure of the first external pipe 1a is finished, the larger end of the cone 1c is welded to the end of the first external pipe 1a near the supporting plate 2, and one end of the second external pipe 1b is welded to the end of the first external pipe 1a near the ring 4, then the shell 1 is finished.

The filter and muffler device 5 according to the present invention consists of a hollow tube 5a, a plurality of steel flanges 5b, and a plurality of filter materials 5c carpeting on the flanges. The flanges 5b are alternately welded on the hollow tube 5a, then the filter materials 5c are fixed on the steel flanges 5b by screws 7 or other fixers, e.g. steel meshes. The filter materials 5c can be asbestos, glass wool, ceramic wool, or ferric powders.

Figure 2:
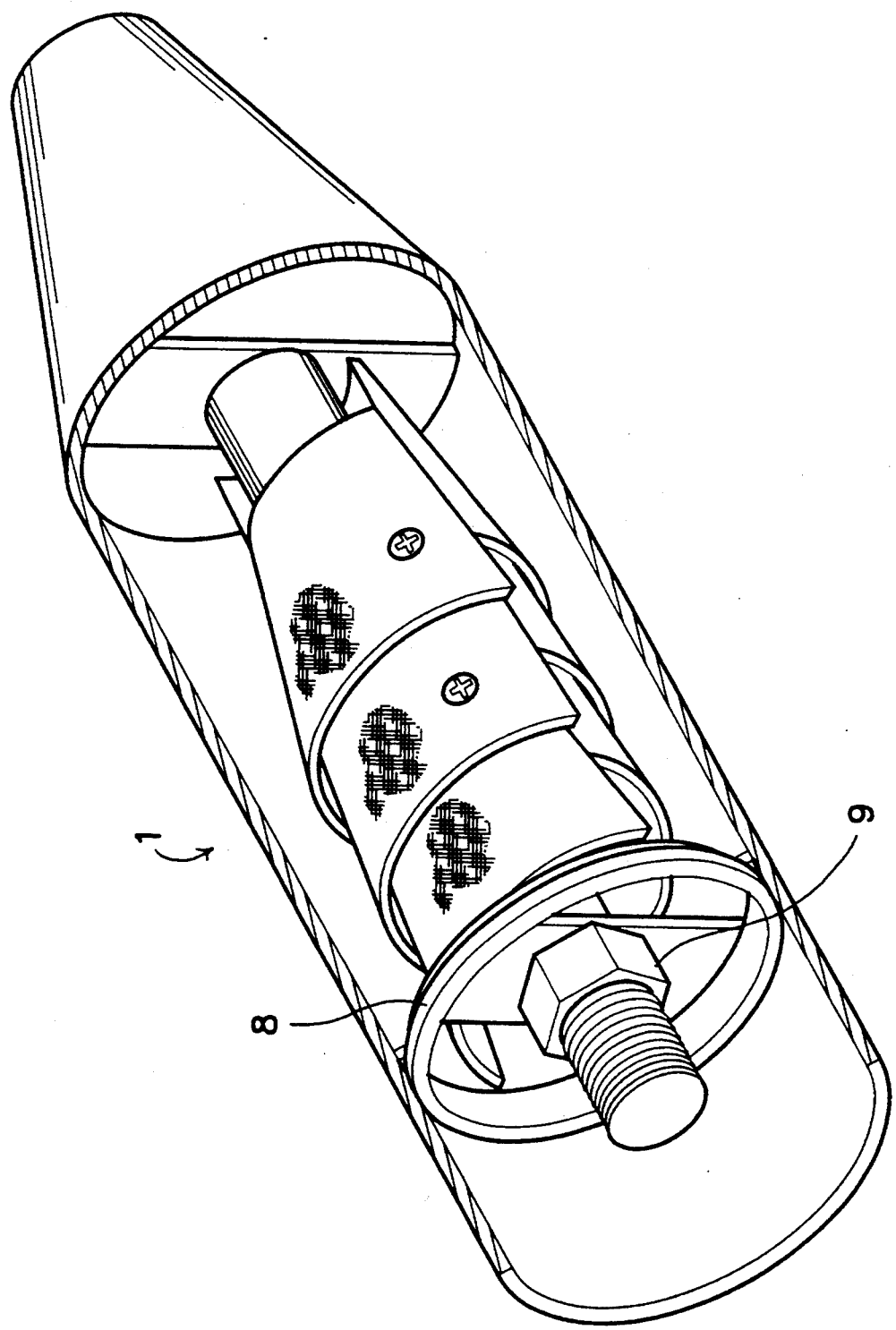
FIG. 2 is a partly sectional perspective view of the assembled embodiment shown in FIG. 1.

After the hollow tube 5a of the filter and muffler device 5 is sleeved on the central axle 3 of the shell 1, the filter and muffler device 5 can be then fixed by the stopper 8 and the screw 9. FIG. 2 shows the partly diagrammatic sectional illustration of the assembled filter and muffler system according to the present invention.

Figure 3:
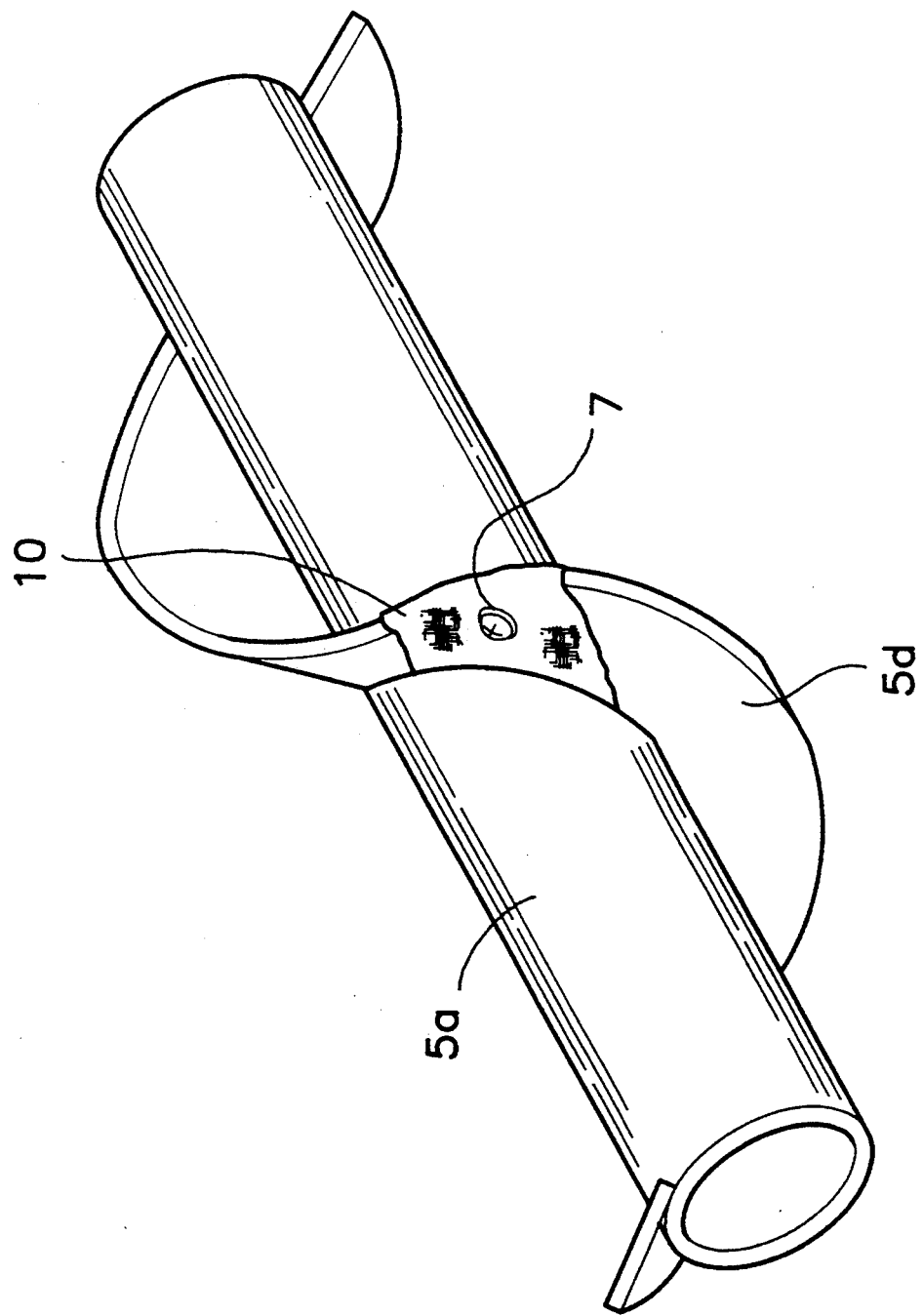
FIG. 3 is a perspective view of an embodiment of the filter and muffler device according to the present invention.

There are other embodiments of the filter and muffler device used in the present invention. As shown in FIG. 3, for example, the filter and muffler device is constructed by welding a spiral steel sheet 5d on the hollow tube 5a, and fixing a filter material 10 by screw 7. Constructed in this way, the exhaust of the vehicle will be expelled spirally.

Figure 4:
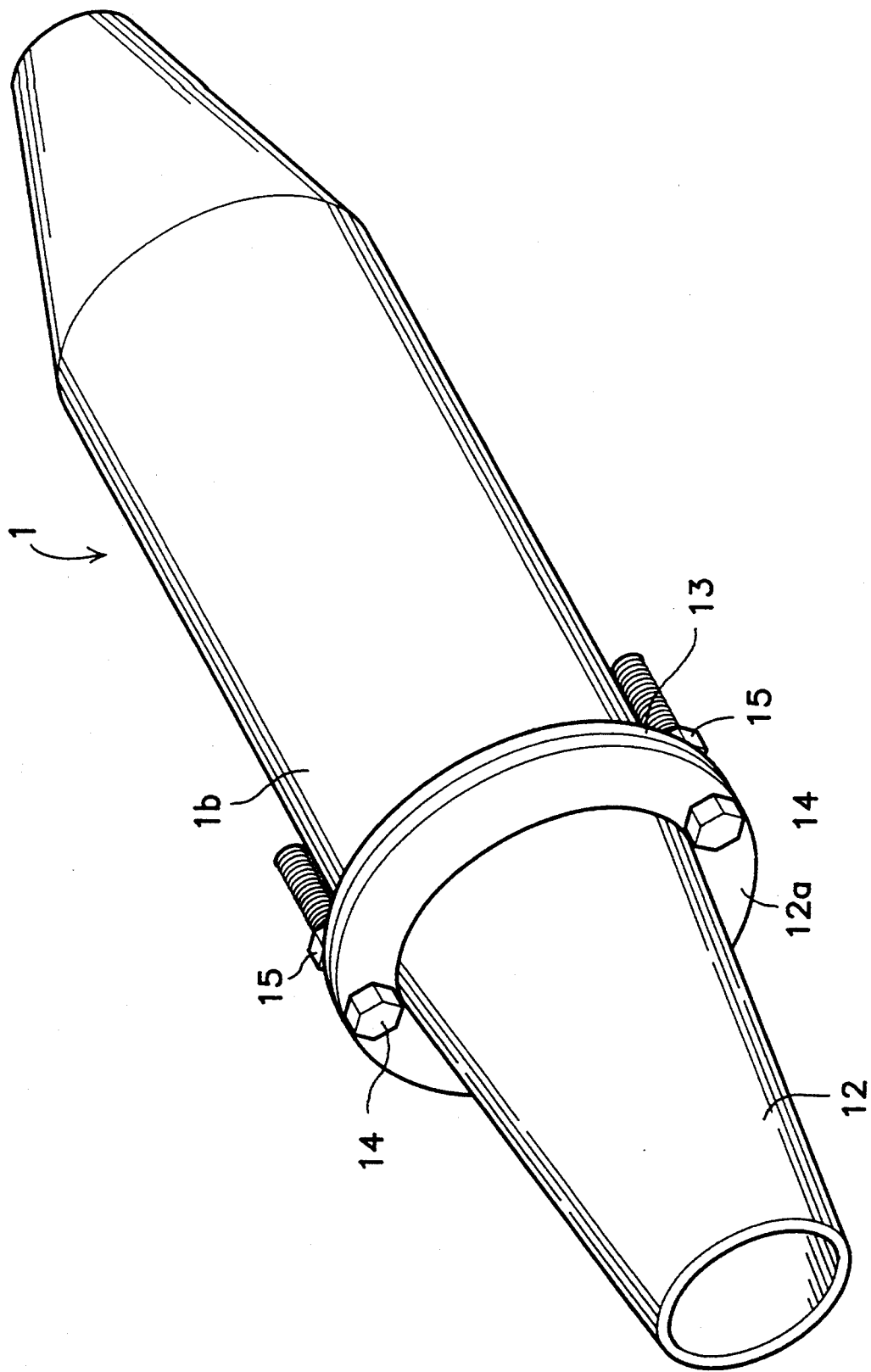
FIG. 4 is a perspective view of an embodiment of the shell.
Figure 5:
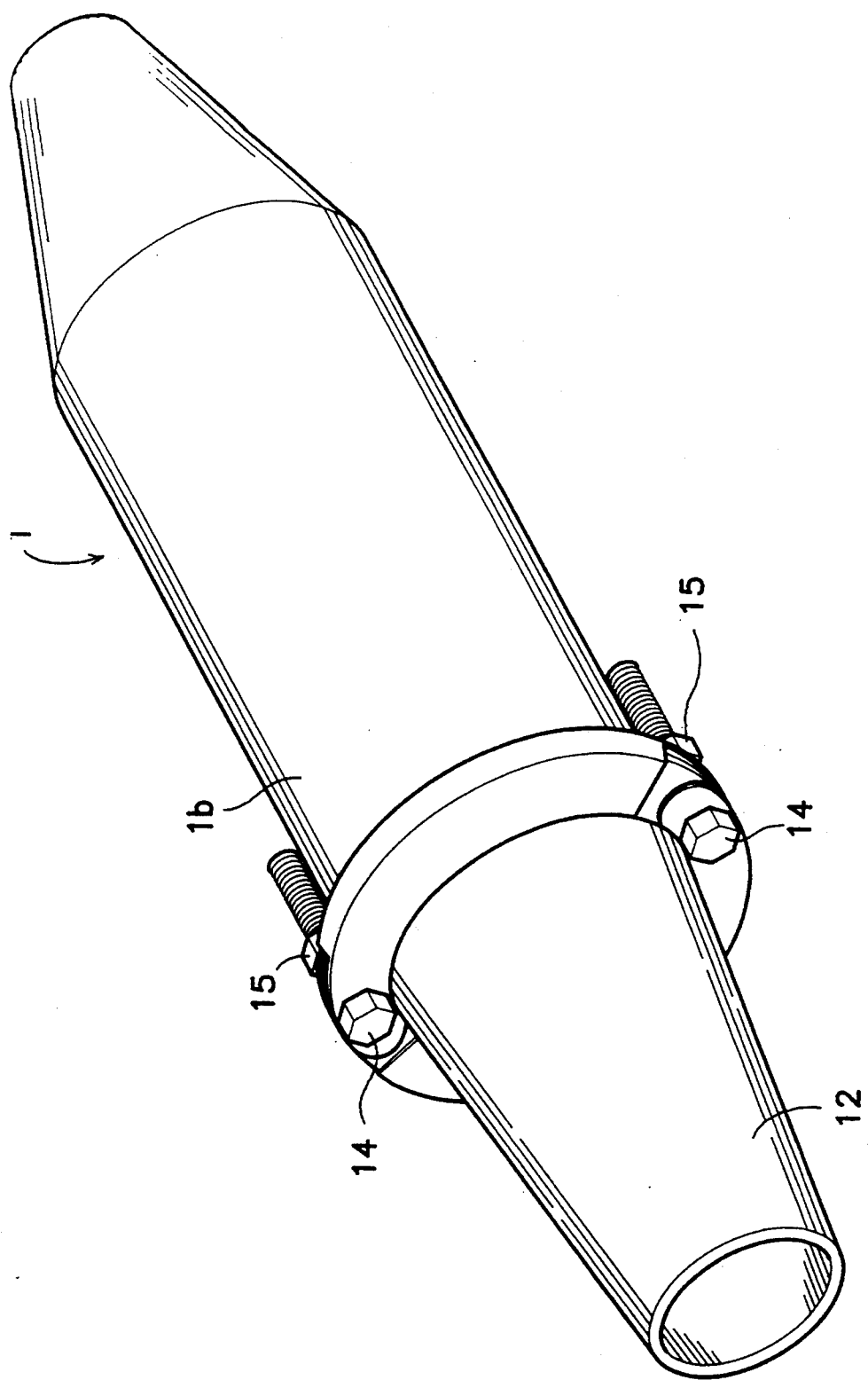
FIG. 5 is a perspective view of another embodiment of the shell.
Figure 6:
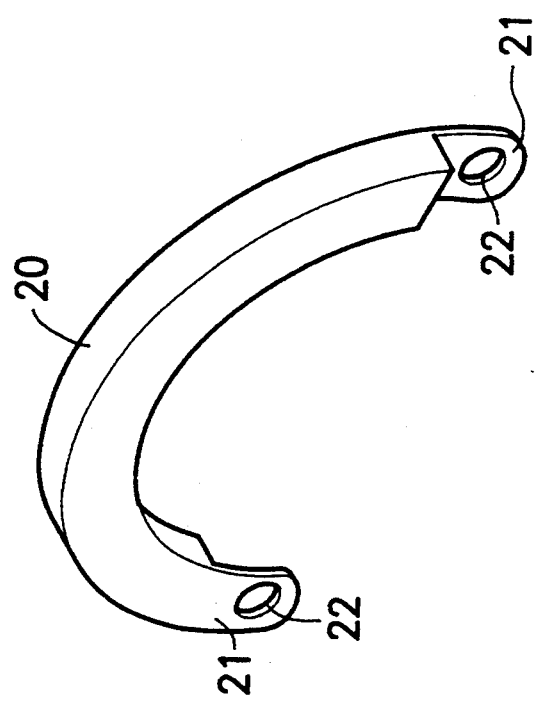
FIG. 6 is a perspective view of a clamp.

A modified embodiment of the present invention used on a car is shown in FIG. 4. A cone tail 12 is included in the entire system. A first coupling ring 13 is welded at the external peripheral of the end of the second external pipe 1b. A second coupling ring 12a is welded at the external peripheral of the larger end of the cone tail 12. Both of the first coupling ring 13 and the second coupling ring 12a have two holes correspondingly. Each of the holes is opposite the other. The cone tail 12 can be fixed on the shell 1 by two screws 15 and two bolts 14. A alternative is shown in FIG. 5. Two clamps 20 are used to secure the fixing between the cone pipe 12 and the shell 1. The clamp 20 is shown in FIG. 6, which is mainly a semicircular steel ferrule having two ends fragmented to form two taps 21. Two holes 22 are formed on the taps 21 in correspondence with the holes of the first coupling ring 13 and the second coupling ring 12a. The clamps 20 avoid the accidental looseness of the cone tail 12.

At the time of need to replace the filter and muffler device 5 after a long duration of use, the filter and muffler device 5 can be easily detached by loosing bolts 14 and screws 15 to remove the cone tail 12 first, and then loosing screw 9 to release the filter and muffler device 5 for checking or replacing.

Figure 7:
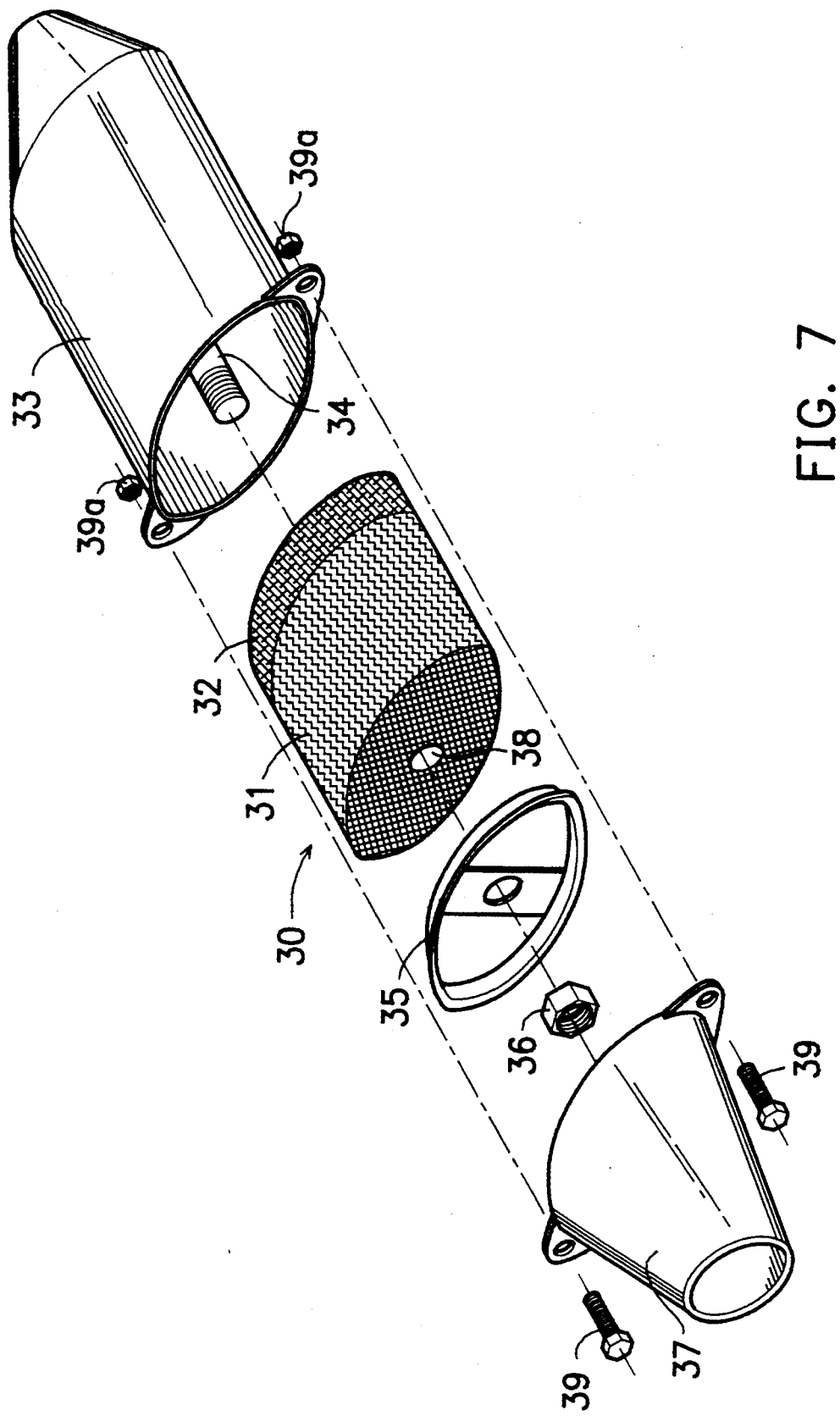
FIG. 7 is an exploded perspective view of another embodiment according to the present invention.

In other embodiments of the present invention, a honeycomb catalyst converter can be utilized. The embodiment shown in FIG. 7 is like that shown in FIGS. 1 to 4, but the shell 33 is flattened to became oval, so as to increase the effective area of the honeycomb catalyst converter. Honeycomb catalyst converter 30 is in the same shape of the shell 1 with its center having a through hole 38 to receive the central axle 34 of the shell 33. A steel mesh 31 surrounds the honeycomb catalyst converter 30 for protection against vibration and shock. The outer periphery of one end of the honeycomb catalyst converter 30 is surrounded with a seal 32 made of heat resistant material, to avoid leakage of exhaust gas. Stopper 35 and cone tail pipe 37 are mostly the same as stopper 8 and cone tail pipe 12, except that they are flattened to fit the shell 33. Screw 36 is the same as screw 9. Cone tail pipe 37 are screwed on the shell 33 by bolts 39 and screws 39a.

Figure 8:
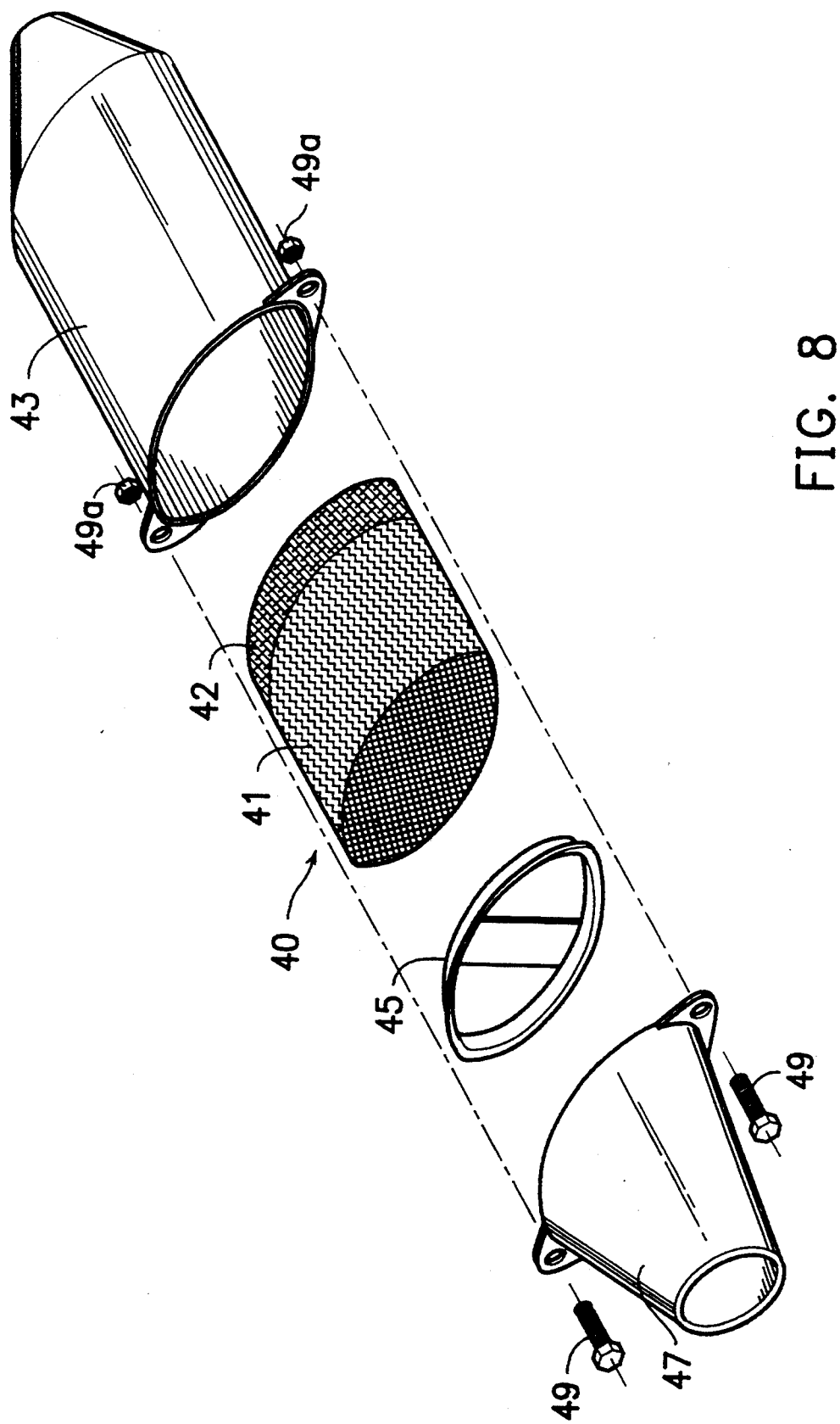
FIG. 8 is an exploded perspective view of another embodiment according to the present invention.

Another modification is shown in FIG. 8. This embodiment utilizes a honeycomb catalyst converter 40 but the honeycomb catalyst converter is not punctured. The structure of this embodiment is principally the same as that shown in FIG. 7, but stopper 45 has two tabs with holes to be fixed by bolts 49.

As stated above, the filter and muffler device of the exhaust system according to the present invention can be removed to check if it can be further used, or if it should be replaced lest the engine be damaged or engine power be reduced. Thus it considerably reduces the effort required to maintain the exhaust system. If the filter is worn out, there is no need to replace the entire exhaust pipe, but only to remove and replace the filter and muffler device, thereby reducing maintenance costs.

While the invention has been described by way of an example and in terms of several preferred embodiments, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A detachable filter and muffler system used in the exhaust pipe of an engine system for absorbing the noises and filtering out the contaminants in the exhaust pipe, comprising:
   a shell, the shell comprising a first external pipe; and
   a second external pipe welded at one end of the first external pipe; and
   a cone pipe, the larger end of the cone pipe being welded to the end of the first external pipe opposite to the second external pipe, the smaller end of the cone pipe being welded to the exhaust pipe.
   a filter and muffler device, which is characterized in that said filter and muffler device is screwed in said shell; and wherein said first external pipe comprises:
   a supporting plate welded at the end of the first external pipe near the cone pipe;
   a central axle, one end of the central axle being welded to the center of said supporting plate, the other end of the central axle being provided with screw threads;
   a ring provided at the inner edge of the end of the first external pipe opposite to the supporting plate; and
   a stopper having a taper ring and a supporting plate welded to the center of the taper ring, the supporting plate of the stopper having a hole at its center, so as to be sleeved on the central axle.

2. The detachable filter and muffler system as claimed in claim 1, wherein said filter and muffler device comprises:
   a hollow tube;
   a spiral steel sheet, welded on the hollow tube; and
   a filter material fixed on the spiral steel sheet.

3. The detachable filter and muffler system as claimed in claim 1, wherein said filter and muffler device comprises:
   a hollow tube;
   a plurality of steel flanges alternately welded on the hollow tube; and
   a plurality of filter materials carpeting on the flanges, for absorbing the noises and filtering out the contaminants.

4. The detachable filter and muffler system as claimed in claim 3, wherein said filter materials are asbestos.

5. The detachable filter and muffler system as claimed in claim 3, wherein said filter materials are glass wool.

6. The detachable filter and muffler system as claimed in claim 3, wherein said filter materials are ceramic wool.

7. The detachable filter and muffler system as claimed in claim 3, wherein said filter materials are ferric powders.

8. A detachable filter and muffler system used in the exhaust pipe of an engine system for absorbing the noises and filtering out the contaminants in the exhaust pipe, including a shell, said shell comprising:
   a first external pipe;
   a second external pipe welded at one end of the first external pipe; and
   a cone pipe, the larger end of the cone pipe being welded to the end of the first external pipe opposite to the second external pipe, the smaller end of the cone pipe being welded to the exhaust pipe, and a filter and muffler device, which is characterized in that said filter and muffler device is screwed in said shell, wherein said shell filter comprises a coupling ring welded at the end of the second external pipe.

9. The detachable filter and muffler system as claimed in claim 8, further comprising a cone tail pipe, the larger end of the cone tail pipe being screwed on the coupling ring of the second external pipe.

* * * * *